(12) United States Patent
Grismore et al.

(10) Patent No.: US 6,574,566 B2
(45) Date of Patent: Jun. 3, 2003

(54) AUTOMATED FEATURE IDENTIFICATION IN DATA DISPLAYS

(75) Inventors: John R. Grismore, Bartlesville, OK (US); Dennis B. Neff, Bartlesville, OK (US); William A. Lucas, Bartlesville, OK (US)

(73) Assignee: Conocophillips Company, Houston, TX (US)

( * ) Notice: Subject to any disclaimer, the term of this patent is extended or adjusted under 35 U.S.C. 154(b) by 26 days.

(21) Appl. No.: 09/746,605

(22) Filed: Dec. 22, 2000

(65) Prior Publication Data

US 2001/0032051 A1 Oct. 18, 2001

Related U.S. Application Data

(60) Provisional application No. 60/173,209, filed on Dec. 27, 1999.

(51) Int. Cl.[7] .............................................. G01V 1/28
(52) U.S. Cl. ........................................................ 702/16
(58) Field of Search .................... 702/14, 16; 367/73, 367/72

(56) References Cited

U.S. PATENT DOCUMENTS

| | | | |
|---|---|---|---|
| 5,226,019 A | 7/1993 | Bahorich | 367/74 |
| 5,383,114 A | 1/1995 | Chambers | 364/421 |
| 5,475,589 A | 12/1995 | Armitage | 364/421 |
| 5,691,958 A | 11/1997 | Calvert et al. | 367/73 |
| 5,822,450 A | 10/1998 | Arakawa et al. | 382/152 |
| 5,930,730 A | * 7/1999 | Marfurt et al. | 702/16 |
| 5,966,672 A | * 10/1999 | Knupp | 702/16 |
| 6,226,596 B1 | * 5/2001 | Gao | 702/16 |

FOREIGN PATENT DOCUMENTS

| | | | |
|---|---|---|---|
| WO | WO 99/64983 | 12/1999 | G06K/9/42 |

\* cited by examiner

*Primary Examiner*—Donald McElheny
(74) *Attorney, Agent, or Firm*—Ryan N. Cross

(57) ABSTRACT

A method for recognizing and comparing features of attribute data expressed in a 3D data survey involves: extracting, mapping, color coding and displaying 3D data for at least one attribute. Preferably, the data is based on tomographic paths. The tomographic paths are defined within a subvolume of instantaneous attribute data having the shape of a sphere. This is accomplished by extracting the subvolume of attribute data having a desired shape, defining multiple tomographic paths extending from a point within the subvolume to its bounding surface, combining instantaneous attribute values encountered along each of the tomographic paths to determine multiple aggregate values, mapping the thus determined aggregate attribute values on the surface of the sphere using a color code, and displaying the color coded sphere. The attribute maps are correlated with preexisting geological or stratigraphic templates to identify features.

21 Claims, 4 Drawing Sheets

(2 of 4 Drawing Sheet(s) Filed in Color)

AUTOMATED FEATURE IDENTIFICATION IN DATA DISPLAYS

This application claims the benefit of U.S. Provisional Application No. 60/173,209, filed Dec. 27, 1999.

This invention relates to processing data, and more particularly it relates to a method and apparatus for creating displays, preferably tomographic displays, of three-dimensional (3D) data to aid in visualization of aggregate attribute information. More particularly, it relates to creating tomographic displays to aid in the visualization of aggregate seismic attribute information, which information identifies changes in geology, lithology, and pore fluid content within the earth's subsurface formations.

BACKGROUND OF THE INVENTION

Numerous techniques for exploring the earth to acquire geophysical data are well known. Seismic surveys, however, are the most reliable and most definitive geophysical means of structural representation currently in use. For many years seismic exploration for oil and gas reservoirs has involved the use of a source of seismic energy and its reception by an array of seismic detectors, generally referred to as geophones. When used on land, the source of seismic energy can be a high explosive charge electrically detonated in a borehole located at a selected point on the terrain, or another energy source having capacity for delivering a series of impacts or mechanical vibrations to the earth's surface. The acoustic waves generated in the earth by these sources are partially transmitted back from strata boundaries and reach the surface of the earth at varying time intervals, depending on the distance and the characteristics of the subsurface traversed. These returning waves are detected by the geophones, which function to transduce such acoustic waves into representative electrical analog signals. In use, an array of geophones is generally laid out along a line to form a series of observations stations within a desired locality, the source injects acoustic signals into the earth, and the detected signals are recorded for later processing using digital computers, where the analog signals are generally quantized as digital sample points, e.g., one sample every two milliseconds, such that each sample point may be operated on individually. Accordingly, seismic field records are reduced to vertical and/or horizontal cross sections which approximate subsurface features. The acoustic source and the geophone array are then moved along the line to a new position and the process repeated to provide a complete seismic survey. Three-dimensional (3D) seismic surveys involve geophones and sources laid out in generally rectangular grids covering an area of interest so as to expand area coverage and enable construction of 3D views of reflector positions over wide areas.

After exploration of an area is completed, data relating to energy detected at the plurality of geophones will have been recorded, where the geophones are located at varying distances from the shotpoints. The data is then reorganized to collect traces from data transmitted at various shotpoints and recorded at various geophone locations, where the traces are grouped such that the reflections of the group can be assumed to have been reflected from a particular depth point within the earth, i.e., a common midpoint (CMP). The individual traces are then corrected for the differing distance the seismic energy travels through the earth from the corresponding shotpoints, to the common midpoint, and upwardly to the various geophones. This step includes correction for the varying velocities through the rock layers of different types. The correction for the varying spacing of shotpoint/geophone pairs is referred to as "normal move out." After this is done the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoints data. As is well known to those skilled in the art, processing of seismic data may vary, but normally includes normal move out, stacking, migration and deconvolution.

Originally, seismic traces were used simply for ascertaining subterranean formation structure. However, exploration geophysicists have developed a plurality of time-series transformations to obtain a variety of characteristics that describe the seismic traces, and such characteristics have been termed "instantaneous attributes" because values for the attributes are generally obtained for each time sample point in the seismic data, or within a small time window of data points. These attributes provide quantitative measures of the wavelike nature of the seismic signal traces, and may characterize changes in properties of the earths subsurface formations. Examples of instantaneous attributes include, but are not limited to, amplitude, frequency, phase, dip, dip azimuth, power, pseudo porosity, etc. Attributes may be displayed as measured values of the seismic data, or may be calculated based on the seismic data. By mapping displays of such instantaneous attributes on displays of seismic section or volume data, geophysicists have characterized and identified changes in lithology, geology, pseudo porosity and pore fluid content associated with individual reflection events in the seismic trace data. Seismic attributes are not limited to instantaneous attributes, and as used herein an attribute includes any way of characterizing a seismic trace. For example, "interval" attributes, which are the attributes of seismic traces calculated within a seismic interval, are often analyzed.

The sole purpose of the above described and other data processing and measurement efforts, which are known to those skilled in the art, is to facilitate the final and most critical phase of the seismic exploration method, namely, data interpretation. This interpretation includes reduction of the data to a realistic model of the subsurface strata, and illustration of both structural configurations and geologic characteristics of subsurface volumes.

Accordingly, there is a need for seismic displays that aid in understanding and characterizing various attributes by displaying aggregate seismic attribute information in an intuitive and meaningful manner.

In addition to seismic data interpretations, other areas of data interpretation can benefit from improved methods and apparatus which aid in understanding and characterizing various attributes. One such area is medical imaging, such as the imaging of brain scans. Current imaging systems are scale dependent and, hence, it is difficult to compare different brain scan attributes because the subject of one brain scan may be larger or smaller than the subject of a comparison brain scan, such as comparing a child's brain scan to an adult's brain scan.

Accordingly, there is a need for imaging displays that aid in understanding and characterizing various attributes and that are scale independent.

It is an object of this invention to accumulate and display values for attributes in an intuitive and meaningful manner.

It is another object of this invention to display values for attributes in a way that allows better comparison because it is scale independent.

It is another object of this invention to accumulate and display aggregate tomographic values for seismic attributes such as: amplitude, acoustic impedance, continuity factors, pseudo porosity, etc.

It is a more specific object of this invention to accumulate attribute values along a tomographic path within a subvolume of data corresponding to a 3D figure, and to map the aggregate value of the attribute for display on the surface of the 3D figure.

It is another object to compare similar subvolume displays based on their tomographic attribute maps.

Yet another object is to identify geological and stratigraphic features based on the tomographic attribute maps of subterranean volumes.

Still another object of this invention is to characterize subvolumes by combining all values of the tomographic attribute into a single number and assigning the combined value to the center point of the subvolume.

Another object is to automate geological and stratigraphic feature identification and comparison, so as to reduce subjectivity of feature identification.

Another object of this invention is to identify and compare geological and stratigraphic features by correlating attribute maps with known templates.

Yet another object is to make scale independent feature identifications and comparisons.

SUMMARY OF THE INVENTION

According to the present invention, the foregoing and other objects and advantages are attained in a method and apparatus for extracting, mapping and displaying attribute data based on intersection geometry or selected tomographic paths within an arbitrary solid figure, 3D object or region of space (hereinafter "3D volume"). More particularly, the present invention utilizes such method and apparatus for extracting, mapping and displaying 3D seismic attribute data onto a computer model based on selected tomographic paths within attribute 3D volumes. This method relies on computer software and involves extracting attribute data from a attribute data volume, which is generally prestored in the computer memory, and where the extracted data corresponds to data points included in a data subvolume defined by the shape of the 3D volume. A second step calls for selecting extracted data and mapping the extracted data on the surface of the 3D volume, using an appropriate distinguishing code, such as a color code or rugosity. The coded 3D volume can be displayed on a flat surface or monitor.

In a preferred embodiment, the extracted data is selected corresponding to the bounding surface of the 3D volume and mapped onto the surface of the 3D volume.

In a more preferred embodiment, the extracted data is selected along multiple tomographic paths extending from a central or other representative point in the 3D volume to the bounding surface of the 3D volume. Next, the attribute values are accumulated along each of the multiple tomographic paths to obtain a corresponding multiple of aggregate values. The aggregate values are mapped on the surface of the 3D volume.

In accordance with another aspect of this invention, a method for automating identification of features in data involves comparing the attribute maps with preexisting template maps of specific features. This is accomplished by mathematically correlating the 3D volume attribute map with the preexisting template maps using the well known correlation methods, such as normalized cross correlation algorithm, which provides a measure of the similarity between attribute maps and templates, or an extended correlation algorithm, which provides the measure of similarity in combination with a normalized absolute amplitude difference attribute maps and templates. Other methods of correlation, such as semblance and difference can also be used. The method then rejects correlations below a selected threshold value and assigns a coded feature identification of the best fit template to the attribute map being compared. Thus, feature identification are assigned to the subvolume, and a display of a data volume with values coded for identified features is provided. For example, if the method is utilized for seismic data, the method for automating identification of geological and stratigraphic features in the seismic data involves comparing the attribute maps with preexisting template stratigraphic features. Accordingly, stratigraphic features identification, such as onlap, downlap, unconformity, etc., or geologic features, such as faults, rollover, saddle, etc. are assigned to the subvolume, and a display of a data volume with values coded for identified features is provided.

In a preferred embodiment, the 3D volume is selected from the group of 3D volumes including; a sphere, a cylinder, a cube, an orthorhombic, or other arbitrary figures. Generally, the most preferred figure is the sphere, and the presently most preferred tomographic paths are the radii of the sphere.

The method and apparatus of this invention thus displays data in a form that aids in identifying specific features of the 3D volume. For seismic data, the method and apparatus of this invention, using an aggregate value for mapping a seismic attribute on the surface of a solid figure, thus displays seismic data in a form that aids in identifying specific geological, or stratigraphic features of subterranean volumes. Also, the display is orientation independent. Color coding the attribute values creates a pattern of colors on the surface of a solid figure, such as a sphere, representing the aggregate attribute for the data within the volume of the sphere. Automated feature identification allows displaying of a series of feature spheres, which are selected throughout a data volume, and permits a user to manipulate the scene to inspect the spheres from any location and orientation. This automated feature identification allows a user to compare different orientations of a map to the preexisting template to enable the user to choose the best orientation fit. Further, this automated feature reduces the time required for identification of specific features, as well as reducing the subjectivity of making the comparisons of attribute maps with preexisting templates.

Still other objects and advantages of the present invention will become readily apparent to those skilled in this art from the following detailed description and the drawings, wherein there is shown and described only one of several preferred embodiments of the invention. As will be realized several details of this invention are capable of modification in various obvious respects without departing from the invention. Accordingly, the drawings and description are to be regarded as illustrative, and not as restrictive in nature.

BRIEF DESCRIPTION OF THE DRAWINGS

The file of this patent contains at least one drawing executed in color. Copies of this patent with the color drawing will be provided by the Patent and Trademark Office upon request and payment of the necessary fee.

DETAILED DESCRIPTION OF THE INVENTION

Figure 1:
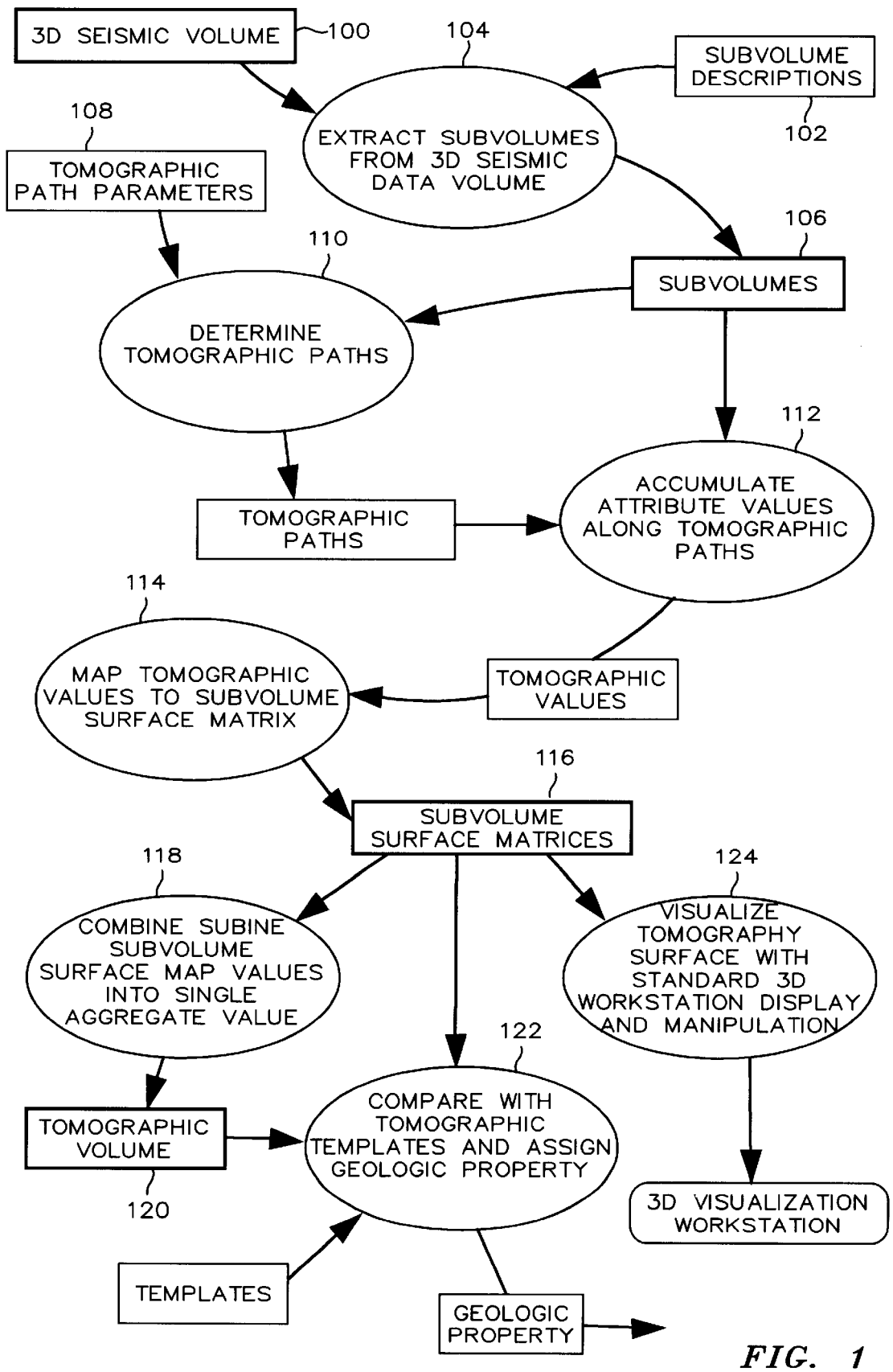
FIG. 1 is a simplified computer flow chart for creating tomographic displays according to this invention.

The invention will be described below in the context of its use with seismic data and a spherical 3D volume; however, this should not be construed as limiting the invention to either seismic data or spherical 3D volumes. The inventive method and apparatus is not confined to seismic data or geophysics, but can be applied equally well for comparing attributes in any field, such as medical imaging or meteorology. Additionally, the invention is applicable to other 3D volumes, such as cylinders, cubes, orthorhombic, or other arbitrary volumes.

One way to visualize the geometric expanse of a attribute data is to extract a subvolume of attribute data corresponding to the bounding surface of a 3D volume such as a sphere or other arbitrary 3D volumes, and to map the extracted data for display on the surface of the 3D volume. The extracted data can be coded, such as by color coding or rugosity, prior to mapping.

A more preferred way to visualize the geometric expanse of a attribute data is to extract a subvolume of attribute data from a larger data volume, where the extracted data corresponds to a 3D volume such as a sphere or other arbitrary 3D volumes, and to map a tomographically derived aggregate value of the selected attribute for display on the surface of the 3D volume. As used herein tomography involves point to surface observations. Accordingly, using a sphere as an example figure, selecting a relatively large number of radii of the sphere as tomographic paths, and deriving a cumulative aggregate value of a specific attribute along each of these radii allows mapping of the aggregate value of the attribute onto the surface of the sphere from which the original data was provided. Then color coding the aggregate attribute values creates a pattern of colors on the surface of the sphere which are representative of the aggregate attribute values from the volume of data within the sphere.

For example, if the data being analyzed is stratagram data, i.e., representative of reflection boundaries, a simple count of the number of interfaces encountered along each tomographic path would display a characteristic pattern on the sphere surface for specific geological or stratigraphic features. Flat, parallel subterranean beds would display a series of horizontal parallel "latitude circles" on the sphere, with color shading increasing toward the poles to represent the increasing number of layers traversed.

Seismic attributes can be obtained by any one of a variety of well-known transformations applied to seismic data, or simply by measurements made on the seismic traces. The attributes are quantitatively descriptive of some aspect of the wavelike nature of the seismic signals comprising the seismic data. By way of example, U.S. Pat. No. 5,453,958 issued to Dennis B. Neff, discloses an attribute based on seismic data which is related to the dip of subterranean layers. The disclosure of this patent is incorporated herein by reference. Accordingly, attribute data can be arranged in a data volume in a manner analogous to arranging the original data in a volume, such that subvolumes of the attribute data can be extracted where the subvolume of extracted data corresponds to a 3D volume.

Generally, the basic seismic data to which this invention may be applied is in the form of a spatial sequence of time or depth scale seismic traces, which have been recorded, digitized, stacked and migrated over appropriate time windows and arranged in a data volume, as is well known to those skilled in the art. Further, instantaneous attributes have been obtained for the data volume, also as is well known to those skilled in the art.

Referring now to FIG. 1, there is shown a simplified computer flow chart of typical processing steps, which are used to create displays based on tomographic techniques in processing of seismic data, and in which the displays correspond to a selected 3D volume. One begins by storing a 3D seismic volume of instantaneous attributes in the computer memory as illustrated at 100, and providing the computer with subvolume descriptors for defining the shape and size of the subvolume to be analyzed as shown at 102. At step 104 a subvolume of seismic data is extracted from the data volume, where the subvolume of extracted data corresponds to the shape of the 3D volume, which is defined by the subvolume descriptor provided in step 102.

As previously mentioned the 3D volume can be any arbitrary shape; however, the presently contemplated shapes include a sphere, a cylinder, a cube, and an orthorhombic. The program then proceeds to store the extracted subvolume in block 106 for use in later processing.

At step 108, data defining multiple tomographic paths in the 3D volume is provided to the computer, and at step 110 the multiple tomographic paths provided in step 108 are inserted in the attribute data defined by the 3D volume. Generally, the tomographic paths will extend from a central point within the subvolume to the surface of the subvolume, e.g., the radii of a sphere. However, any desired representative point within the subvolume may be selected as the central point. Next in step 112 multiple accumulated attribute values are computed based on the data values along each of the tomographic paths. The aggregate values can be obtained by any suitable method based on arithmetic, statistical or some multiattribute operations. For example, the aggregate value may be a sum or an average of attribute values encountered along the tomographic path.

At step 114, the multiple tomographic values determined in step 112 are mapped onto a subvolume surface matrix using an appropriate distinguishing code, such as a color code or rugosity, and stored in computer memory at block 116 for use in three other processing steps. At step 118, all surface map values are combined, for example, by summing or averaging, and the thus determined single aggregate value is assigned to the central point of the subvolume. This combined value is stored in computer memory as shown in block 120, where multiple combined values are arranged in a tomographic data volume. At step 122, pre-defined templates of geological properties such as pseudo porosity or fault plane characteristics, etc., are compared with a subvolume surface matrix provided from block 116 or a tomographic volume provided from block 120. A geological property is then assigned to the subvolume matrix or the tomographic volume based on the comparison in step 122. Step 124 involves providing a workstation display for visualizing the matrices stored in block 116 via a surface display on any standard 3D seismic workstation having suitable display and manipulation capacities.

Figure 2:
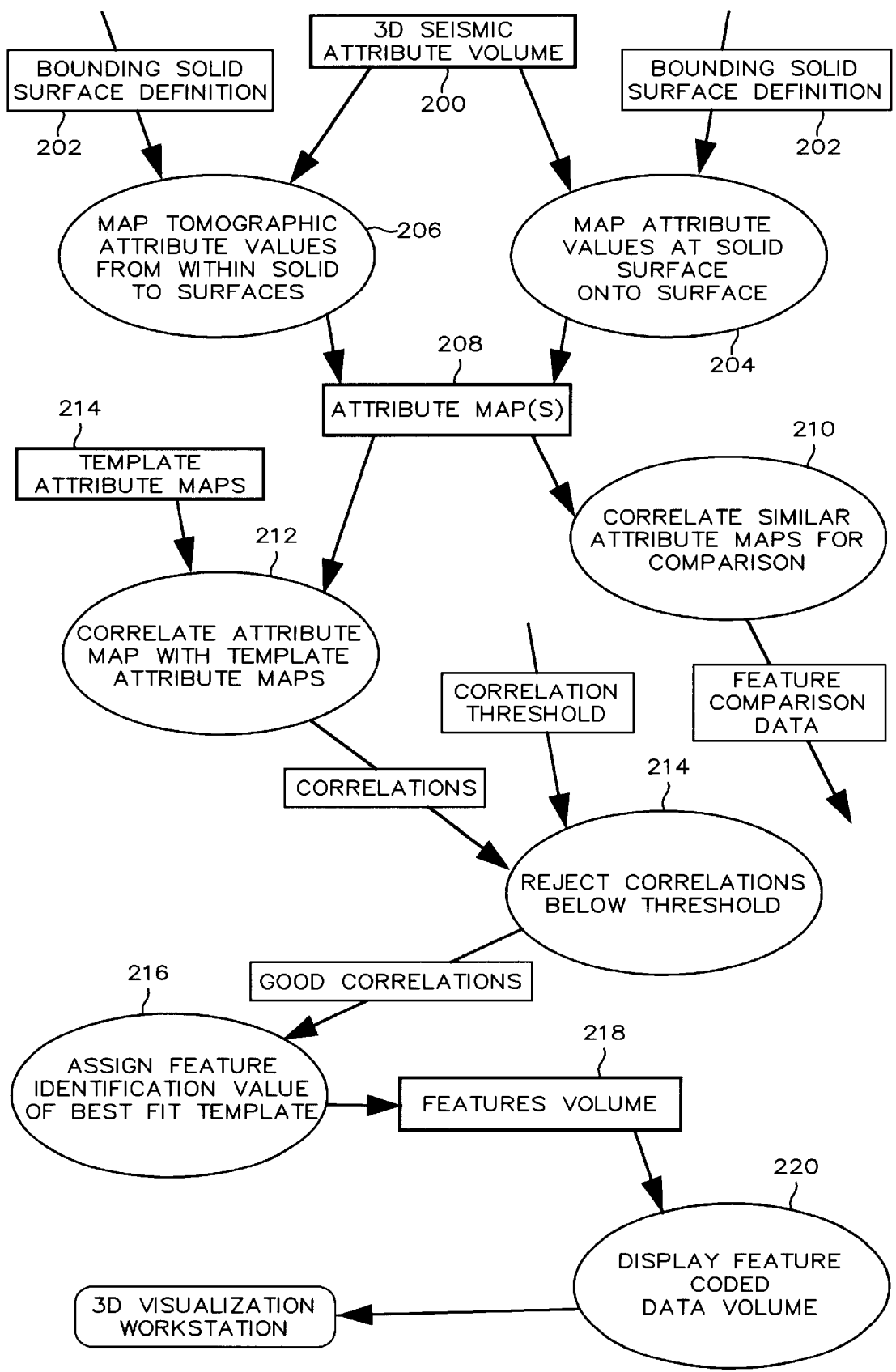
FIG. 2 is a simplified computer flow chart for automating feature identification based on tomographic map displays according to this invention.

Referring now to FIG. 2, there is illustrated a simplified computer flow chart for recognizing and comparing geological or stratigraphic features expressed in 3D seismic data volumes. This automated feature identification quantifies geological or stratigraphic features by mapping attributes onto the surface of a 3D volume, and then automatically correlates the map of the 3D volume with pre-existing template maps.

One begins by storing a 3D seismic volume of instantaneous attribute data in the computer memory as illustrated at 200, for use in the two following steps 204 and 206. The definition for the bounding solid surface to be analyzed is shown in step 202, and this definition is provided as an input for use in steps 204 and 206. In step 204 attribute maps are created using a tomographic path from a point within the bounding surface to the surface itself, and in step 206 attribute maps are created by mapping attribute values at the 3D volume onto the surface. The resulting attribute maps are then stored in the computer as shown at block 208. At step 210 similar attribute maps are correlated to provide feature comparison data. At step 212, pre-existing template attribute maps are input from block 214, and attribute maps are input from block 208 for use in correlation of the attribute maps and template attribute maps in step 212, which is carried out using the appropriate correlation algorithms. The correlation can be carried out using any suitable correlation technique such as cross correlation, semblance or difference.

At step 214 a correlation threshold is provided for comparison with correlations computed in step 212, and maps having correlations values which are less than the threshold value are rejected, and maps having greater correlations are further processed in step 216. At step 216 a coded feature identification value is assigned to each attribute map corresponding to the code of the template which best fit the attribute map. The thus coded feature maps are stored in computer memory as shown at block 218. At step 220 a display of the feature coded attribute map is produced using a 3D seismic visualization workstation.

Figure 3A:
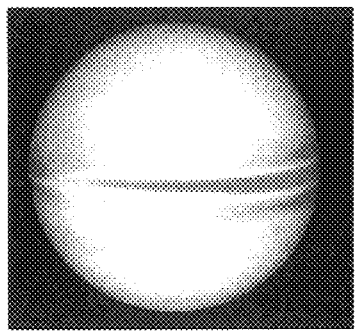
FIG. 3(a) is a color drawing illustrating an amplitude tomography sphere.
Figure 3B:
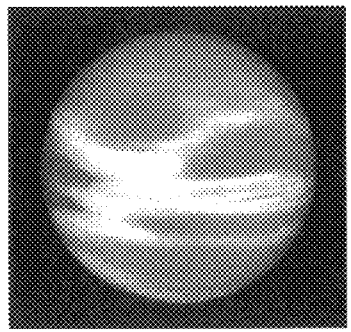
FIG. 3(b) is a color drawing illustrating a pseudo porosity tomography sphere.
Figure 3C:
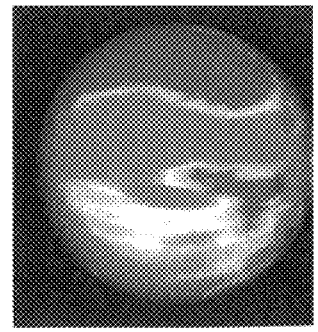
FIG. 3(c) is a color drawing illustrating a fault plane tomography sphere.
Figure 4:
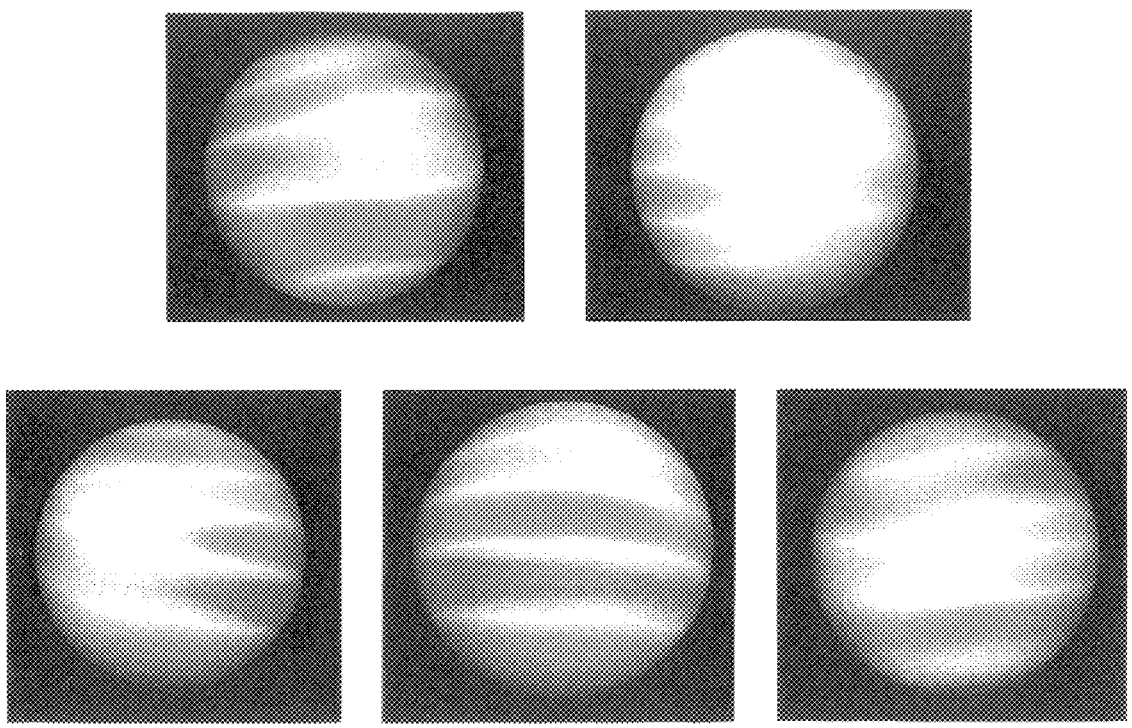
FIG. 4 is a color drawing illustrating a series of feature spheres.

FIG. 3(a) is an example of a spherical amplitude tomograph map display according to this invention. This display is based on synthesized seismic traces, and uses color coding of the amplitude tomographic attribute of a spherical subvolume, which is extracted from a seismic data volume, for creating a pattern of colors on the surface of the sphere. This type of display facilitates an efficient method for comparing color patterns of multiple subvolumes so as to identify volumes having similar geology, lithology, or pore fluid content in the earths subsurface formations. FIGS. 3(b) and 3(c) are similar drawings illustrating color coding for pseudo porosity and fault plane characteristics respectively of tomographic spheres. Likewise, FIG. 4 illustrates a series of tomographic feature spheres serially extracted throughout a data volume, and which aids in identifying small changes in geological and stratigraphic features within the data volume.

The foregoing figures and descriptions of the present invention are illustrative and explanatory in nature, however, those skilled in the art will recognize that improvements can be made in the present invention without departing from the scope of the invention. In particular, a display for a wide variety of additional seismic attributes will become apparent to those skilled in geophysical arts. Accordingly, applicants invention is to be limited only by the scope of the claims attached hereto.

That which is claimed is:

1. A method for displaying attribute data values, wherein said attribute data values are derived based on a sphere, said method comprising:
   (a) extracting attribute data values corresponding to at least a portion of the volume of said sphere from an attribute data volume;
   (b) selecting at least a portion of the thus resulting extracted attribute data values to obtain selected data;
   (c) mapping said selected data on the surface of said sphere; and
   (d) producing an attribute map by displaying said sphere having said selected data mapped thereon.

2. A method in accordance with claim 1, wherein said selected data are color coded for display with said sphere.

3. A method in accordance with claim 1, wherein said selected data are coded by rugosity for display with said sphere.

4. A method in accordance with claim 1, wherein the following steps are added for identifying features of said attribute data volume, said method additionally comprising:
   comparing said attribute map with a known template map of specific features.

5. A method in accordance with claim 4, wherein said step of comparing said attribute map and said template map comprises correlating selected attribute data included in said attribute map and said template maps to determine a correlation value.

6. A method in accordance with claim 5, wherein said step of comparing said attribute map and said template map further comprises comparing said correlation value with a threshold value.

7. A method in accordance with claim 1 wherein step (b) comprises selecting the thus resulting extracted attribute data values that corresponds to the surface of said sphere.

8. A method in accordance with claim 1 wherein step (b) comprises selecting a plurality of tomographic paths extending from a point within said sphere to the surface of said sphere and accumulating attribute data values along each of said plurality of tomographic paths to determine a plurality of aggregate attribute values corresponding to said plurality of paths.

9. A method in accordance with claim 8, wherein said plurality of tomographic paths are radii of said sphere.

10. A method in accordance with claim 8, wherein said step of accumulating attribute values along each of said tomographic paths includes at least one of the arithmetic operations consisting of sum, difference, product and ratio of attribute values along said tomographic path.

11. Apparatus for displaying attribute data values, wherein said attribute data values are derived based on a sphere, said apparatus comprising:
   a computer programmed for:
      (a) extracting attribute data values corresponding to at least a portion of the volume of said sphere from a attribute data volume;
      (b) selecting at least a portion of the thus resulting extracted attribute data values to obtain selected data;
      (c) mapping said selected data on the surface of said sphere; and
      (d) producing an attribute map by displaying said sphere having said selected data mapped thereon.

12. A method for displaying aggregate attribute data values, wherein said aggregate attribute data values are tomographically derived based on a sphere, said method comprising:

(a) extracting attribute data values corresponding to at least a portion of the volume of said sphere from a attribute data volume;

(b) selecting a plurality of tomographic paths extending from a point within said sphere to the surface of said sphere;

(c) accumulating attribute data values along each of said plurality of tomographic paths to determine a plurality of aggregate attribute values corresponding to said plurality of paths;

(d) mapping said plurality of aggregate attribute values on the surface of said sphere; and (e) producing an aggregate attribute map by displaying said sphere having said plurality of aggregate attribute values mapped thereon.

13. A method in accordance with claim 12, wherein said plurality of tomographic paths are radii of said sphere.

14. A method in accordance with claim 12, wherein said step of accumulating attribute data values along each of said tomographic paths includes at least one of the arithmetic operations consisting of sum, difference, product and ratio of attribute data values along said tomographic path.

15. A method in accordance with claim 12, wherein said plurality of aggregate attribute values are color coded for display with said sphere.

16. A method in accordance with claim 12, wherein said plurality of aggregate attribute values are coded by rugosity for display with said sphere.

17. A method in accordance with claim 12, wherein said step of accumulating attribute data values along each of said tomographic paths includes averaging attribute values along said tomographic path.

18. A method in accordance with claim 12, wherein the following steps are added for automatically identifying features in said attribute data volume, said method additionally comprising:

comparing said attribute map with a known template map of specific features.

19. A method in accordance with claim 18, wherein said step of comparing said attribute map and said template map comprises correlating selected aggregate attribute values included in said attribute map and said template maps to determine a correlation value.

20. A method in accordance with claim 19, wherein said step of comparing said attribute map and said template map further comprises comparing said correlation value with a threshold value.

21. Apparatus for displaying aggregate attribute values, wherein said aggregate attribute values are tomographically derived based on a sphere, said apparatus comprising:

a computer programmed for:
(a) extracting attribute data values corresponding to at least a portion of the volume of said sphere from a attribute data volume;

(b) selecting a plurality of tomographic paths from a point within said solid figure to the surface of said sphere;

(c) accumulating attribute data values along each of said plurality of tomographic paths to determine a plurality of aggregate attribute values corresponding to said plurality of paths;

(d) mapping said plurality of aggregate attribute values on the surface of said sphere; and (e) producing an aggregate attribute map by displaying said sphere having said aggregate attribute values mapped thereon.

* * * * *